US012775403B2

(12) United States Patent
Ge

(10) Patent No.: US 12,775,403 B2
(45) **Date of Patent: *Oct. 27, 2026**

(54) LIGHT HIBERNATION MODE FOR MEMORY

(71) Applicant: Micron Technology, Inc., Boise, ID (US)

(72) Inventor: Liang Ge, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/947,633

(22) Filed: Nov. 14, 2024

(65) Prior Publication Data

US 2025/0147679 A1 May 8, 2025

Related U.S. Application Data

(63) Continuation of application No. 17/420,173, filed as application No. PCT/CN2021/090620 on Apr. 28, 2021, now Pat. No. 12,164,786.

(51) Int. Cl.
*G06F 3/00* (2006.01)
*G06F 1/324* (2019.01)
*G06F 3/06* (2006.01)

(52) U.S. Cl.
CPC ............ *G06F 3/0625* (2013.01); *G06F 1/324* (2013.01); *G06F 3/0634* (2013.01); *G06F 3/0683* (2013.01)

(58) Field of Classification Search
None
See application file for complete search history.

(56) References Cited

U.S. PATENT DOCUMENTS 11,531,473 B1 * 12/2022 Ionin .................. G06F 11/1068
11,983,415 B2 5/2024 Zhu et al.

(Continued)

FOREIGN PATENT DOCUMENTS

CN 104380259 A 2/2015
CN 104885034 A 9/2015
CN 112148208 A 12/2020

OTHER PUBLICATIONS

International Search Report and Written Opinion received for PCT Patent Application No. PCT/CN2021/090620, mailed on Feb. 8, 2022, 9 pages.

*Primary Examiner* — Midys Rojas
(74) *Attorney, Agent, or Firm* — Holland & Hart LLP

(57) ABSTRACT

Methods, systems, and devices for a light hibernation mode for memory are described. A memory system may include volatile memory and non-volatile memory and may be configured to operate according to a first mode of operation (e.g., associated with relatively high power consumption), a light hibernation mode (e.g., a second mode associated with decreased power consumption in comparison to the first mode), and a full hibernation mode (e.g., a third mode of operation associated with decreased power consumption in comparison to the light hibernation mode). While operating according to the light hibernation mode, the memory system may maintain a greater quantity of data in the volatile memory relative to the full hibernation mode, which may avoid at least some power consumption related to data transfers between the volatile memory and non-volatile memory that may occur in connection with entering and exiting the full hibernation mode.

20 Claims, 6 Drawing Sheets

(56) References Cited

U.S. PATENT DOCUMENTS

| | | | |
|---|---|---|---|
| 2002/0064079 | A1 | 5/2002 | Sato et al. |
| 2021/0064113 | A1 | 3/2021 | Laurent et al. |
| 2023/0367491 | A1 | 11/2023 | Zhao et al. |

* cited by examiner

LIGHT HIBERNATION MODE FOR MEMORY

CROSS REFERENCE

The present application for patent is a continuation of U.S. patent application Ser. No. 17/420,173 by Ge et al., entitled "LIGHT HIBERNATION MODE FOR MEMORY," filed Jul. 1, 2021, which claims priority to PCT Patent Application No. PCT/CN2021/090620 by Get et al., entitled "LIGHT HIBERNATION MODE FOR MEMORY," filed Apr. 28, 2021, each of which is assigned to the assignee hereof, and each of which is expressly incorporated by reference in its entirety herein.

FIELD OF TECHNOLOGY

The following relates generally to one or more systems for memory and more specifically to a light hibernation mode for memory.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
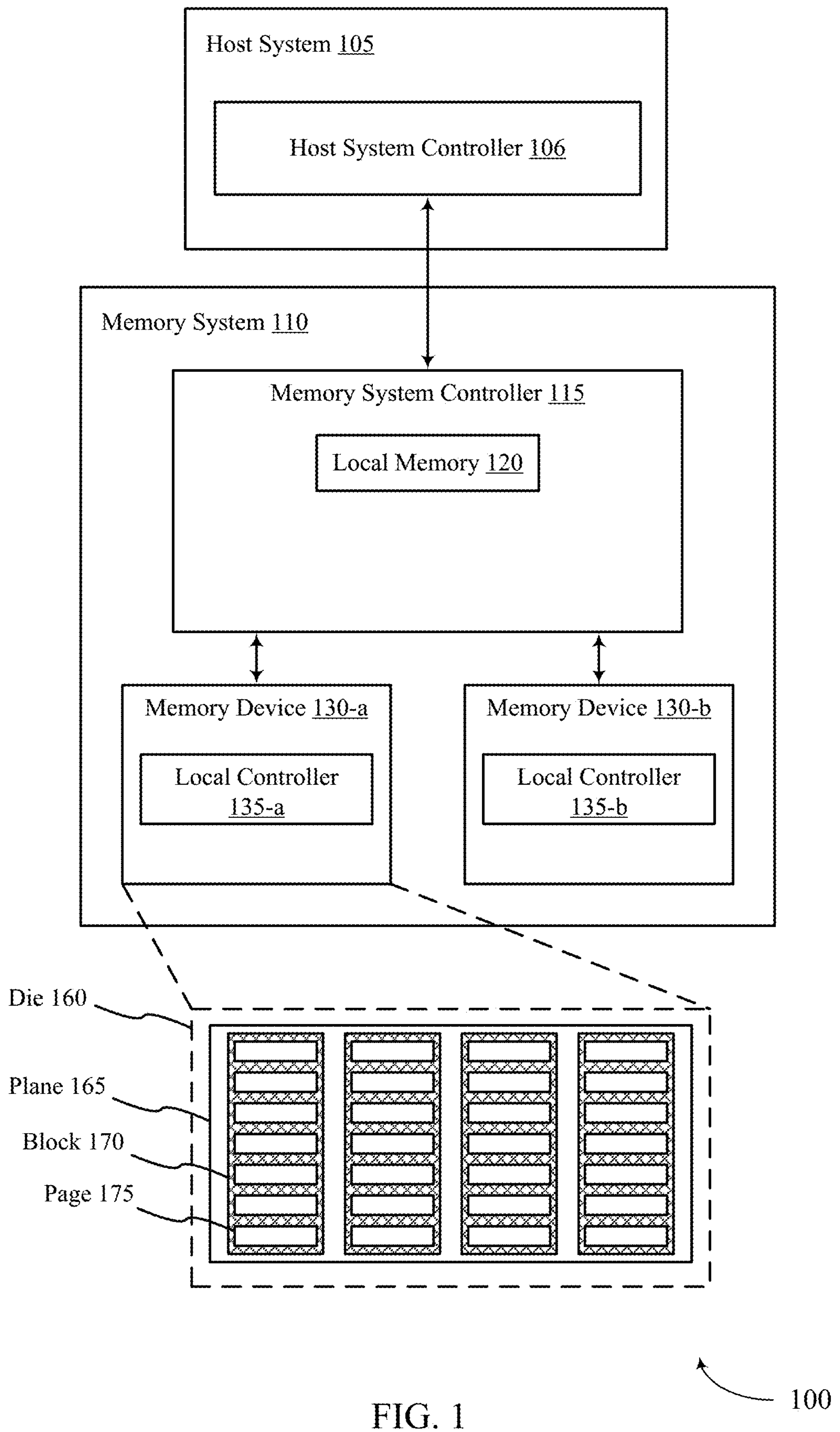
FIG. 1 illustrates an example of a system that supports a light hibernation mode for memory in accordance with examples as disclosed herein.

A memory system may enter a full hibernation mode (e.g., an H8 mode of operation) associated with a decreased power consumption (e.g., as compared to a first or normal mode of operation). During the full hibernation mode, the memory system may decrease a power supplied to volatile memory (e.g., random access memory (RAM)) at the memory system), either completely or so as to maintain only a fraction of the data stored by the volatile memory prior to entering the hibernation mode. That is, the memory system may transfer most or all of the data stored by the volatile memory from the volatile memory to non-volatile memory (e.g., not-and (NAND) memory) prior to or otherwise in connection with entering the hibernation mode. Upon exiting the hibernation mode (e.g., and returning to the first or normal mode of operation), the memory system may transfer some or all of such data back from the non-volatile memory to the volatile memory.

In some examples, the memory system may enter the hibernation mode for a relatively short time period. However, some operations associated with entering and exiting the hibernation mode may be associated with a high power consumption. For example, transferring data from volatile to non-volatile memory (e.g., prior to entering the hibernation mode) and transferring data from non-volatile back to volatile memory (e.g., based on exiting the hibernation mode) as described above may increase a power consumption of the memory system. Thus, operating the memory system in the hibernation mode for the short time period may introduce inefficient power usage for the memory system compared to remaining in the hibernation mode for a longer time period.

To improve power efficiency, a memory system as described herein may additionally support a light hibernation mode (e.g., in addition to a full hibernation mode), and the memory system may be transitioned into the light hibernation mode in cases that the memory system enters the hibernation mode for a relatively short period of time. For example, a host system may determine whether a duration for an upcoming hibernation mode exceeds a threshold duration. In cases that the duration for the hibernation mode exceeds the threshold duration, the host system may communicate a command to the memory system to enter the full hibernation mode of operation. Additionally, in cases that the duration for the hibernation mode is less than the threshold duration, the host system may communicate a command to the memory system to enter the light hibernation mode of operation.

In some cases, operations associated with entering and exiting the light hibernation mode may consume less power as compared to operations associated with entering and exiting the full hibernation mode. For example, in connection with entering and exiting the light hibernation mode, the memory system may transfer less data between the volatile memory and the non-volatile memory in comparison to the full hibernation mode. In some cases, in connection with entering and exiting the light hibernation mode, the memory system may transfer no data between the volatile memory and the non-volatile memory. Thus, the memory system may use less power to enter and exit the light hibernation mode of operation as compared to entering and exiting the full hibernation mode of operation. The memory system may, however, consume more power while operating in the light hibernation mode in comparison to operating in the full hibernation mode due to maintaining more of the volatile memory in an active (e.g., powered on) state during the light hibernation mode as compared to the full hibernation mode. Thus, whether operating the memory system in the light hibernation mode is more power efficient than operating the memory system in the full hibernation mode may in some cases depend on how long the memory system is in the hibernation mode. For example, operating the memory system in the light hibernation mode for a relatively short time period may increase a power efficiency at the memory system as compared to operating the memory system in the full hibernation mode for the short time period.

Features of the disclosure are initially described in the context of a systems with reference to FIG. 1. Features of the disclosure are then described in the context of a process flow diagram with reference to FIG. 2. These and other features of the disclosure are further illustrated by and described in the context of apparatus diagrams and flowcharts that relate to a light hibernation mode for memory with reference to FIGS. 3-6.

FIG. 1 illustrates an example of a system 100 that supports a light hibernation mode for memory in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy. Additionally or alternatively, the local memory 120 may include random access memory (RAM). The local memory 120 or a portion thereof may be an example of volatile memory as describe herein.

A memory device 130 may include non-volatile memory (e.g., one or more arrays of non-volatile memory cells). For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include volatile memory (e.g., one or more arrays of volatile memory cells). For example, a memory device 130 may include RAM memory cells, such as dynamic RAM (DRAM) memory cells and synchronous DRAM (SDRAM) memory cells. Thus one or more memory devices 130 (or a portion thereof) may be an example of a non-volatile memory as describe herein. Additionally or alternatively, one or more memory devices 130 (or a portion thereof) may be an example of a volatile memory as describe herein. For example, one or more memory devices 130 or a portion thereof may be non-volatile memory, and one or more other memory devices 130 or a portion thereof may be volatile memory.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The memory system 110 may be configured to operate in one or more different modes of operation, each associated with different amounts of power consumption. For example, the memory system 110 may operate in a first mode of operation associated with a normal power consumption. Additionally, the memory system 110 may be configured to operate in one or more lower power modes, which may alternatively be referred to as hibernation modes (e.g., a full hibernation mode, a light hibernation mode). While operating the memory system 110 in the lower power mode, the memory system 110 may consume less power as compared to the first mode of operation. That is, if operating the memory system 110 in the lower power mode the memory system 110 may operate one or more of the memory devices 130 (and, in some cases, the local memory 120) according to a power state that consumes less power than a power state associated with the first mode of operation. In one example, the memory system 110 may decrease a clock rate associated with the memory device 130 to decrease a power consumed by the memory device 130 if operating in the lower power mode. Additionally or alternatively, the memory system 110 may decrease a power supplied to one or more of the memory devices 130 if operating in the lower power mode.

While operating the memory system 110 in the lower power mode, the host system 105 may additionally perform one or more operations for the system 100 that the host system 105 may be unable to perform if the memory system 110 is operating in the first mode. For example, the host system 105 may update a clock rate or frequency associated with communications between the host system 105 and the memory system 110 (e.g., a clock associated with the memory system controller 115) while the memory system 110 is operating in a lower power mode. In some cases, the host system 105 may be unable to update the clock rate while the memory system 110 is operating according to the first mode of operation (e.g., associated with a normal power consumption).

The memory system 110 may support more than one lower power mode. For example, the memory system 110 may be able to operate in a light hibernation mode (e.g., associated with a lower power consumption than the first mode of operation) or a full hibernation mode (e.g., associated with a lower power consumption than the light hibernation mode). In some cases, to operate the memory system 110 according to the light hibernation mode, the memory system 110 may operate the volatile memory (e.g., memory devices 130 including volatile memory cells, local memory 120 including volatile memory cells) according to a same power state as during the first mode of operation. Additionally, the memory system 110 may operate the non-volatile memory (e.g., memory devices 130 including non-volatile memory cells) according to a power state that consumes less power than operating the non-volatile memory according to the first mode of operation. To operate the memory system 110 according to the full hibernation mode, the memory system 110 may operate the volatile and non-volatile memory both according to respect power states that consume less power than operating the volatile and non-volatile memory according to the first mode of operation.

While operating according to the light hibernation mode of operation, the memory system 110 may maintain relatively more data in volatile memory at the memory system 110 as compared to the full hibernation mode. For example, if the memory system 110 operates the volatile memory of the memory system 110 according to the same power state as during the first mode of operation (e.g., and maintains a power supply to the volatile memory) during the light hibernation mode, the volatile memory may continue to store all data previously stored in the volatile memory.

While operating according to the full hibernation mode of operation, the memory system 110 may maintain less data in the volatile memory as compared to the light hibernation mode. That is, because the memory system 110 operates the volatile memory of the memory system 110 according to a power state during the full hibernation mode that consumes less power than during both the first mode of operation and the light hibernation mode, the volatile memory may not maintain as much data in the volatile memory. Thus, in connection with entering the full hibernation mode, the memory system 110 may transfer some or all data stored in volatile memory to non-volatile memory. Additionally, after exiting the full hibernation mode (e.g., and returning to operating in the first mode of operation), the memory system 110 may transfer some or all of the data associated with the volatile memory (e.g., that was transferred from the volatile memory in connection with entering the full hibernation mode) back to the volatile memory. In some cases, the memory system 110 may maintain a small portion of volatile memory if operating in the full hibernation mode. Here, the memory system 110 may refrain from transmitting data associated with that portion of volatile memory to non-volatile memory during the full hibernation mode.

In some cases, the host system 105 may determine to transition the memory system 110 to a lower power mode (e.g., a full hibernation mode, a light hibernation mode). Prior to transmitting a command to the memory system 110 to transition from the first mode of operation to the lower power mode, the host system 105 may select the lower power mode (e.g., from a set of lower power modes that includes at least the full hibernation mode and the light hibernation mode). In some cases, the host system 105 may select the lower power mode based on a time period of operating the memory system 110 according to the lower power mode. For example, if the host system 105 determines that the time period for operating the memory system 110 is less than a threshold duration, the host system 105 may select the light hibernation mode. Additionally, if the host system 105 determines that the time period for operating the memory system 110 is greater than a threshold duration, the host system 105 may select the full hibernation mode.

The host system 105 may transmit the command to the memory system 110 to enter the lower power mode and the memory system 110 may adjust a power state of one or more of the memory devices 130 according to the indicated lower power mode. After the time period, the host system 105 may transmit a command to the memory system 110 to exit the lower power mode and the memory system 110 may then update the power states of one or more the memory devices 130 to operate according to the first mode of operation. In some instances (e.g., in cases that the memory system 110 is exiting the full hibernation mode), the memory system 110 may additionally transfer data from non-volatile to volatile memory based on exiting the full hibernation mode.

The system 100 may include any quantity of non-transitory computer readable media that support a light hibernation mode for memory. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
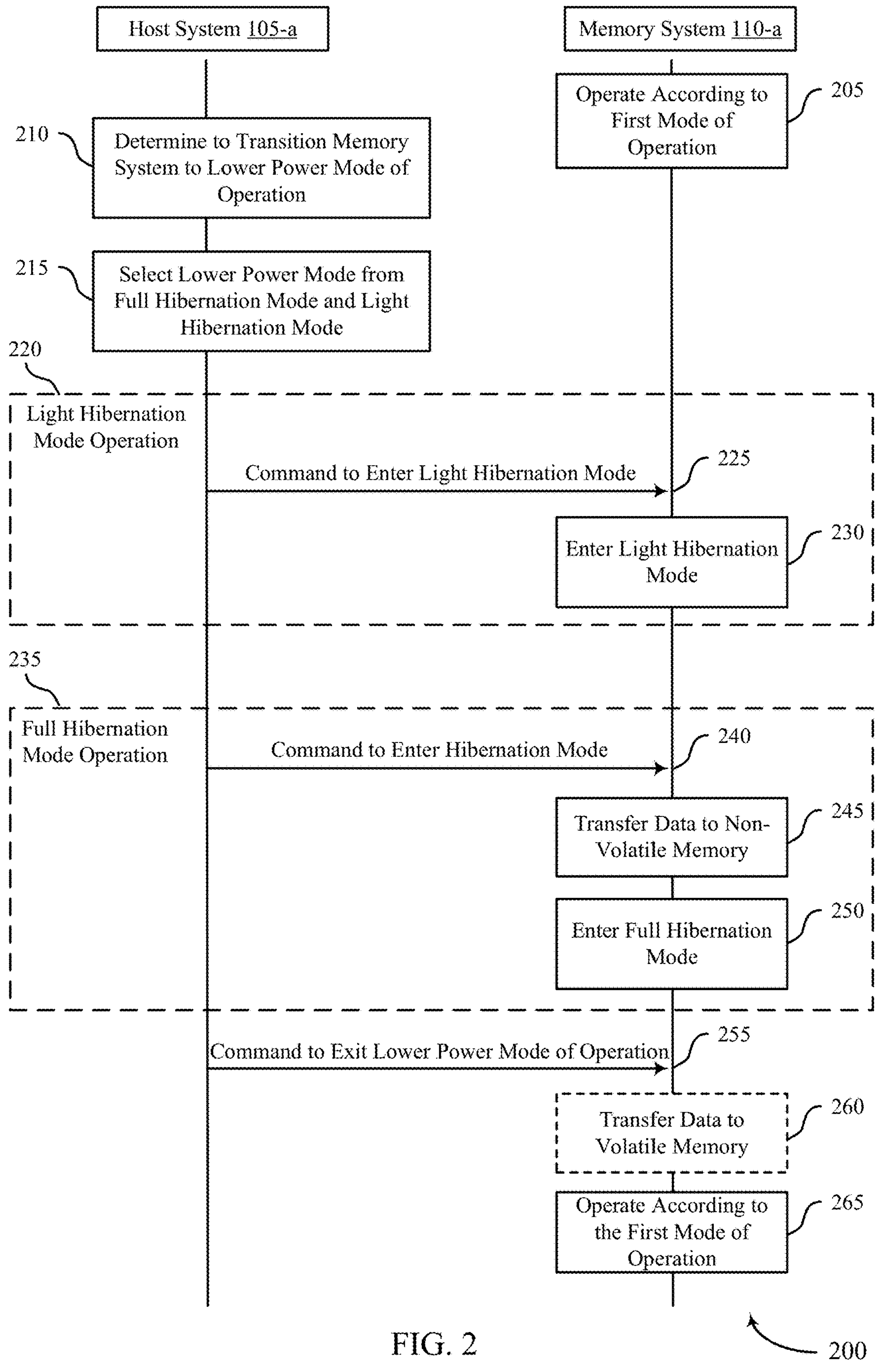
FIG. 2 illustrates an example of a process flow that supports a light hibernation mode for memory in accordance with examples as disclosed herein.

FIG. 2 illustrates an example of a process flow 200 that supports a light hibernation mode for memory in accordance with examples as disclosed herein. Process flow 200 may implement one or more aspects as described with reference to FIG. 1. For example, host system 105-*a* and memory system 110-*a* may be examples of host system 105 and memory system 110, respectively. That is, the memory system 110-*a* may include volatile and non-volatile memory as described with reference to FIG. 1. For example, the volatile memory may be RAM or other volatile memory and may in some cases be included in local memory 120 as described with reference to FIG. 1. As another example, the non-volatile memory may be NAND or other non-volatile memory and may in some cases be included in one or more memory devices 130 as described with reference to FIG. 1. Process flow 200 may illustrate aspects of operating the memory system 110-*a* according to a first mode of operation (e.g., a normal or full-power mode of operation), a light hibernation mode, and a full hibernation mode.

At 205, a memory system 110 may be operated according to a first mode of operation. The first mode of operation may be any mode different than a light hibernation mode or hibernation mode as described herein. For example, the first mode of operation may be a default (e.g., normal or active) mode of operation, and in some cases the first mode of operation may not be a low power mode. The memory system 110 operating according to the first mode of operation may include operating the volatile memory according to a first power state (e.g., associated with normal (e.g., active) operation of the volatile memory) and the non-volatile memory according to a second power state (e.g., associated with normal (e.g., active) operation of the non-volatile memory).

At 210, the host system 105-*a* may determine to transition the memory system 110-*a* to a lower power mode (e.g., the hibernation mode or the light hibernation mode) for a time period. For example, the host system 105-*a* may determine to transition the memory system 110-*a* to the lower power mode for a relatively long time period (e.g., to conserve power of the memory system 110). Or alternatively, the host system 105-*a* may determine to transition the memory system 110-*a* to the lower power mode for a relatively short time period (e.g., to perform one or more operations at the memory system 110-*a* that the host system 105-*a* may be unable to perform while the memory system 110 is operating according to the first mode of operation). As one example, the host system 105-*a* may determine to transition the memory system 110-*a* to the lower power mode for a relatively short time period in order to update a clock frequency associated with the memory system 110-*a* or associated with both the host-system 105-*a* and the memory system 110-*a* (e.g., a clock signal that provides reference timings for communications between the host-system 105-*a* and the memory system 110-*a*).

At 215, based on determining at 210 to transition the memory system to a lower power mode of operation, the host system 105-*a* may select the lower power mode from a set of low power modes. The set of low power modes may include at least a full hibernation mode and a light hibernation mode. In some cases, the host system 105-*a* may select the lower power mode based on a duration of the time period in which the memory system will be in the lower power mode. For example, the host system 105-*a* may compare the time period for operating the memory system 110-*a* in the lower power mode to a threshold duration (e.g., a preconfigured or predefined threshold duration, a dynamically configured duration). In cases that the time period for operating the memory system 110-*a* according to the lower power mode is less than the threshold duration (e.g., fails to satisfy the threshold duration), the host system 105-*a* may select the light hibernation mode and proceed to 220. And in cases that the time period for operating the memory system 110-*a* according to the lower power mode is greater than the threshold duration (e.g., satisfies the threshold duration), the host system 105-*a* may select the full hibernation mode and proceed to 235.

The threshold duration may be configured such that the memory system 110-*a* may consume less power operating in the light hibernation mode (e.g., as compared to operating in the full hibernation mode) if the memory system 110-*a* operates according to the light hibernation mode for less than the threshold duration. Additionally, the memory system 110-*a* may consume less power operating in the full hibernation mode (e.g., as compared to operating in the light hibernation mode) if the memory system 110-*a* operates according to the full hibernation mode for more than the threshold duration. For example, the memory system 110-*a* entering and exiting the light hibernation mode may consume less power as compared to the memory system 110-*a* entering and exiting the full hibernation mode (e.g., due to differences in amounts of data transferred from volatile memory to non-volatile memory when entering the different hibernation modes, differences in amounts of data transferred from non-volatile memory to volatile memory when exit the different hibernation modes, or both). The memory system 110-*a* may, however, consume less power while operating the memory system 110-*a* according to the full hibernation mode as compared to operating the memory system 110-*a* according to the light hibernation mode (e.g., due to differences in the amount of data retained in volatile memory while in the different hibernation modes). Thus, the light hibernation mode may be more power efficient for shorter time periods as compared to the full hibernation mode, and the full hibernation mode may be more power efficient for longer time periods as compared to the light hibernation mode.

The operations at 220 may correspond to cases in which the host system 105-*a* selects the light hibernation mode at 215. For example, at 225, a command to enter the light hibernation mode may be transmitted to the memory system 110-*a* by the host system 105-*a*. In some cases, the host system 105-*a* may transmit the command to enter the light hibernation mode via a distinct type of command (e.g., relative to a different type of command for the memory system 110-*a* to enter the full hibernation mode). Alternatively, a command for the memory system 110-*a* to enter the light hibernation mode may be of a same command type as a command for the memory system 110-*a* to enter the full hibernation mode, but a message within a field of a command of that type may indicate that the memory system 110-*a* is to enter the light hibernation mode of operation in response to the command (or that the memory system 110-*a* is to enter the full hibernation mode of operation, depending on the selection at 215).

At 230, the light hibernation mode may be entered by the memory system 110-*a*. For example, the memory system 110-*a* may operate the volatile memory according to a same power state as during the first mode of operation. Additionally, the memory system 110-*a* may operate the non-volatile memory according to a power state that consumes less power than operating the non-volatile memory according to the first mode of operation. For example, the memory system 110 may refrain from transferring any data from the volatile memory to the non-volatile memory in connection with entering the light hibernation mode. The memory system 110 may maintain the volatile memory in a completely powered-on state while operating in the light hibernation mode (e.g. including data refresh operations). Alternatively, the memory system 110 may transfer some data from the volatile memory to the non-volatile memory in connection with entering the light hibernation mode, but a smaller quantity of data than in connection with entering the full hibernation mode. Or, as another example, the memory system 110 may power down some portion of the volatile memory while operating in the light hibernation mode, but a smaller portion than while operating in the full hibernation mode (e.g., the memory system may maintain a larger portion of the volatile memory in a powered-on state while operating in the light hibernation mode than while operating in the full hibernation mode). Examples of data that may be stored the volatile memory (and hence which may be maintained in volatile memory while the memory system 110-*a* operates in the light hibernation mode) may include data written by or available to be read by the host system 105-*a*, executable instructions (e.g., firmware) for one or more controllers within the memory system 110-*a* (e.g., for a memory system controller 115), or both, among other possible types of data. After entering the light hibernation mode at 230, the memory system 110-*a* may operate according to the light hibernation mode of operation until a command to exit the light hibernation mode is received (e.g., at 255).

The operations at 235 may correspond to cases in which the host system 105-*a* selects the full hibernation mode at 215. For example, at 240, a command to enter the full hibernation mode may be transmitted to the memory system 110-*a* by the host system 105-*a*. In some cases, the host system 105-*a* may transmit the command to enter the full hibernation mode via a distinct type of command (e.g., relative to a different type of command for the memory system 110-*a* to enter the light hibernation mode). Alternatively, a command for the memory system 110-*a* to enter the full hibernation mode may be of a same command type as a command for the memory system 110-*a* to enter the light hibernation mode, but a message within a field of a command of that type may indicate that the memory system 110-*a* is to enter the full hibernation mode of operation in response to the command (as compared to a different message within that field, which may indicate that the memory system 110-*a* is to enter the light hibernation mode of operation).

At 245, at least some data may be transferred from volatile memory of the memory system 110-*a* to non-volatile memory of the memory system 110-*a*. For example, the memory system 110-*a* may transfer data stored in volatile memory that is not maintained (e.g., does not receive adequate power supply to maintain data storage through refresh operations) during the full hibernation mode. In some examples, the memory system 110-*a* may transfer more data to from volatile to non-volatile memory as part of entering the full hibernation mode as compared to entering a light hibernation mode (e.g., as described at 230). In some examples, transferring the data from the volatile memory to the non-volatile memory may result in more power consumption (e.g., a via a current spike, power spike, or both) being associated with entering (e.g., transitioning into) the full hibernation mode than entering (e.g., transitioning into) the light hibernation mode.

At 250, the full hibernation mode may be entered by the memory system 110-*a*. For example, the memory system 110-*a* may operate the volatile and non-volatile memory according to power states that consume less power than operating the volatile and non-volatile memory according to the first mode of operation, respectively. For example, in some cases, the non-volatile memory may be operated the same in the full hibernation mode as in the light hibernation mode, but the volatile memory may be operated in a lower power state in the full hibernation mode relative to the light hibernation mode. For example, the memory system may maintain a larger portion of the volatile memory in a powered-on state, may maintain (e.g., store) a greater quantity of data in the volatile memory, or both, while operating in the light hibernation mode than while operating in the full hibernation mode. After entering the full hibernation mode at 250, the memory system 110-*a* may operate according to the full hibernation mode of operation until a command to exit the light hibernation mode is received (e.g., at 255). While operating the memory system 110-*a* according to the full hibernation mode, the memory system 110-*a* may consume less power as compared to operating the memory system 110-*a* according to the light hibernation mode.

In some examples, the host system 105-*a*, memory system 110-*a*, another system or device, or any combination thereof, may perform one or more operations (e.g., configuration procedures) while the memory system 110-*a* is operating in the lower power mode (e.g., the light hibernation mode or the full hibernation mode). For example, the host system 105-*a* may change a frequency of a clock signal while the memory system 110-*a* operates in the lower power mode. The clock signal may be associated with the memory system 110-*a*, the host-system 105-*a*, or both. In some examples, the host system 105-*a* may change a clock frequency (e.g., an interface clock associated with timing for communications between the memory system 110-*a* and the host system 105-*a*) by performing dynamic voltage and frequency scaling (DVFS) (e.g., via a devfreq parameter). It is to be understood, however, that changing a clock frequency is merely an example operation of the one or more operations that the host system 105-*a*, the memory system 110-*a*, another system or device, or any combination thereof, may perform while the memory system 110-*a* is operating in a lower power mode. The host system 105-*a* may determine at 210 to transition the memory system 110-*a* into a lower power mode for any reason and may perform any quantity or type of operations while the memory system 110-*a* is operating in the lower power mode.

At 255, a command to exit the lower power mode of operation (or alternatively, to enter the first mode of operation or some other mode of operation distinct from the operative lower power mode) may be transmitted to the memory system 110-*a* by the host system 105-*a* (e.g., after the time period). In response to receiving the command at 255, the memory system 110-*a* may be operated according to the first mode of operation (e.g., may exit the lower power mode).

For example, if the memory system 110-*a* is exiting the light hibernation mode (e.g., as described at 220), the host system 105-*a* may at 255 transmit the command for the memory system 110-*a* to exit the light hibernation mode. To exit the light hibernation mode, the memory system 110-*a* may adjust a power state of the non-volatile memory to the power state associated with the first mode of operation (e.g., by increasing a power consumption of the non-volatile memory). In some cases, exiting the light hibernation mode may not involve any adjustment to the power state of the volatile memory. In some other cases, exiting the light hibernation mode may not involve increasing an amount of power supplied to the volatile memory, but to a lesser extent than in connection with exiting the full hibernation mode.

In the example that the memory system 110-*a* is exiting the full hibernation mode (e.g., as described at 235), the host system 105-*a* may at 255 transmit the command for the memory system 110-*a* to exit the full hibernation mode. To exit the full hibernation mode, the memory system 110-*a* may adjust a power state of the volatile and non-volatile memory to the power state associated with the first mode of operation (e.g., by increasing a power consumption of the volatile and non-volatile memory).

In response to receiving the command at 255, the memory system 110-*a* may at 260 transfer from the non-volatile memory to the volatile memory some or all of any data that was previously flushed from the volatile memory (e.g., transferred from the volatile memory to the non-volatile memory) in connection with entering the lower power mode being exited. In some cases, if the memory system 110-*a* is exiting the light hibernation mode, no data may have been previously flushed in connection with entering the light hibernation mode, and thus no data may be transferred at 260. In some other cases, if some data may have been previously flushed in connection with entering the light hibernation mode, and thus some data may be transferred at 260, but a lesser quantity of data than in connection with exiting the full hibernation mode.

At 265, the memory system 110-*a* may resume operating according to the first mode of operation.

Aspects of the process flow 200 may be implemented by a controller, among other components. Additionally or alternatively, aspects of the process flow 200 may be implemented as instructions stored in memory (e.g., firmware stored in a memory coupled with host system 105-*a*, memory system 110-*a*, or both). For example, the instructions, if executed by a controller (e.g., the host system controller 106, local controller 135, local controller 145, or a combination), may cause the controller to perform the operations of the process flow 200.

Figure 3:
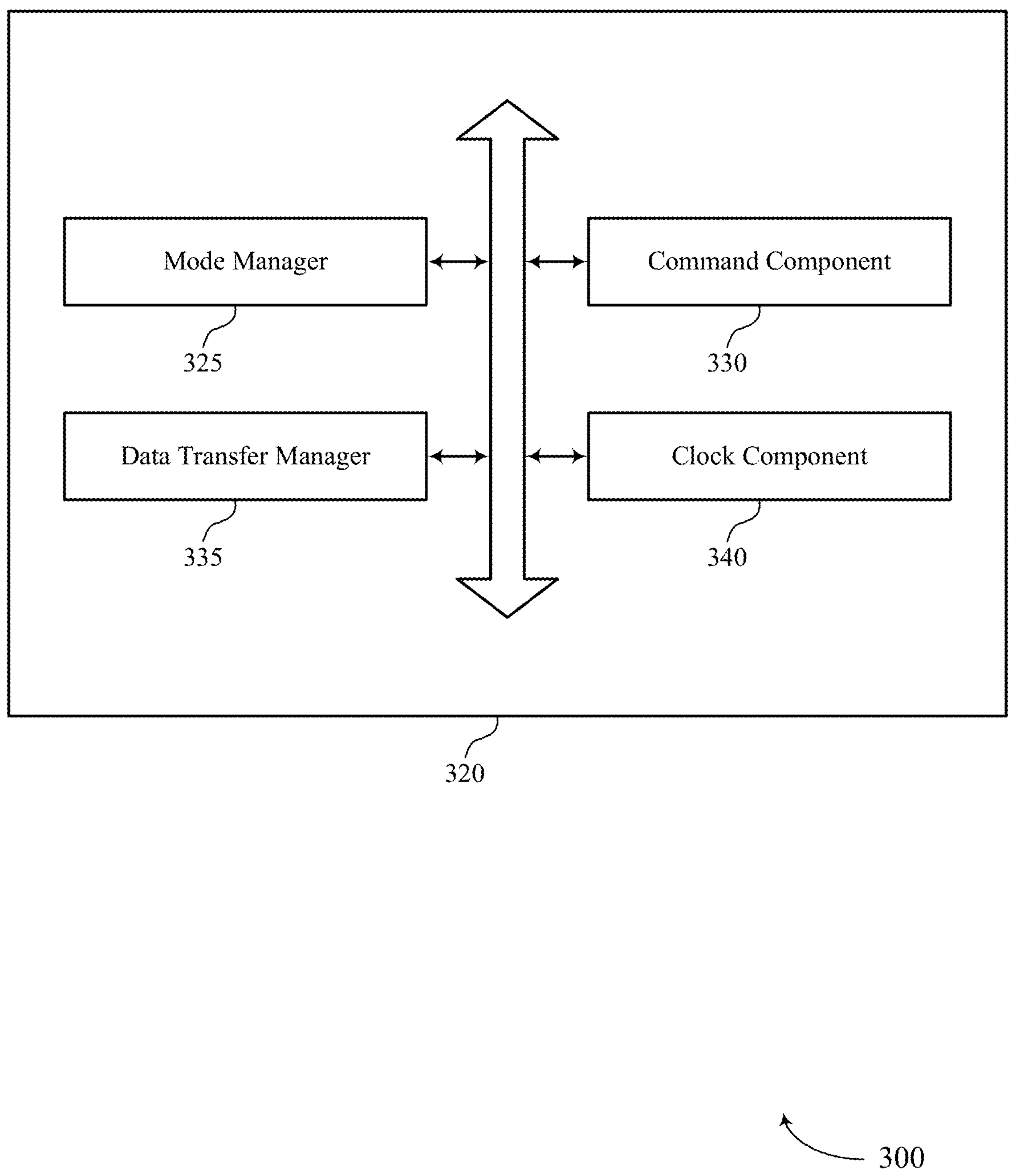
FIG. 3 shows a block diagram of a memory system that supports a light hibernation mode for memory in accordance with examples as disclosed herein.

FIG. 3 shows a block diagram 300 of a memory system 320 that supports a light hibernation mode for memory in accordance with examples as disclosed herein. The memory system 320 may be an example of aspects of a memory system as described with reference to FIGS. 1 through 2. The memory system 320, or various components thereof, may be an example of means for performing various aspects of the light hibernation mode for memory as described herein. For example, the memory system 320 may include a mode manager 325, a command component 330, a data transfer manager 335, a clock component 340, or any combination thereof. Each of these components may communicate, directly or indirectly, with one another (e.g., via one or more buses).

The mode manager 325 may be configured as or otherwise support a means for operating the memory system 320 according to a first mode of operation, where operating the memory system 320 according to the first mode of operation includes operating volatile memory within the memory system in accordance with a first power state and operating non-volatile memory within the memory system in accordance with a second power state. The command component 330 may be configured as or otherwise support a means for receiving, while operating the memory system 320 according to the first mode of operation, a command for the memory system 320 to enter a second mode of operation. The mode manager 325 may be configured as or otherwise support a means for operating the memory system 320 according to the second mode of operation in response to the command, where operating the memory system 320 according to the second mode of operation includes operating the volatile memory in accordance with the first power state and operating the non-volatile memory in accordance with a third power state, the third power state corresponding to lower power consumption than the second power state.

In some examples, the command component 330 may be configured as or otherwise support a means for receiving, while operating the memory system 320 according to the first mode of operation, a second command for the memory system 320 to enter a third mode of operation, where operating the memory system 320 according to the third mode of operation includes operating the volatile memory in accordance with a fourth power state corresponding to lower power consumption than the first power state and operating the non-volatile memory in accordance with the third power state. The mode manager 325 may be configured as or otherwise support a means for operating the memory system 320 according to the third mode of operation.

In some examples, the data transfer manager 335 may be configured as or otherwise support a means for transferring a greater quantity of data from the volatile memory to the non-volatile memory in response to the second command for the memory system 320 to enter the third mode of operation than in response to the command for the memory system 320 to enter the second mode of operation.

In some examples, the data transfer manager 335 may be configured as or otherwise support a means for refraining from transferring any data from the volatile memory to the non-volatile memory in response to the command for the memory system 320 to enter the second mode of operation.

In some examples, the data transfer manager 335 may be configured as or otherwise support a means for storing a greater quantity of data in the volatile memory while operating the memory system 320 according to the second mode of operation than while operating the memory system 320 according to the third mode of operation.

In some examples, data stored in the volatile memory while operating the memory system 320 according to the second mode of operation may include data associated with a host device for the memory system, executable instructions for a controller within the memory system, or any combination thereof.

In some examples, the command component 330 may be configured as or otherwise support a means for receiving, while operating the memory system 320 according to the second mode of operation, a third command for the memory system 320 to exit the second mode of operation. In some examples, the command component 330 may be configured as or otherwise support a means for receiving, while operating the memory system 320 according to the third mode of operation, a fourth command for the memory system 320 to exit the third mode of operation. In some examples, the data transfer manager 335 may be configured as or otherwise support a means for transferring a greater quantity of data from the non-volatile memory to the volatile memory in response to the fourth command for the memory system 320 to exit the third mode of operation than in response to the third command for the memory system 320 to exit the second mode of operation.

In some examples, the mode manager 325 may be configured as or otherwise support a means for operating the memory system 320 according to the first mode of operation after operating the memory system 320 according to the second mode of operation. In some examples, the data transfer manager 335 may be configured as or otherwise support a means for refraining from transferring any data between the volatile memory and the non-volatile memory between a first time and a second time, the first time before beginning to operate the memory system 320 according to the second mode of operation, and the second time after operating the memory system 320 according to the second mode of operation.

The clock component 340 may include, manage, monitor, or otherwise be associated with one or more clocks, where operations of the memory system 320 may be based on (e.g., have timings based on) one or more clock signals associated with the one or more clocks. In some examples, a clock signal associated with the memory system 320 (e.g., associated with the clock component 340) may have a first frequency before the command for the memory system 320 to enter the second mode of operation is received. In some examples, the clock signal may have a second frequency after the command for the memory system 320 to enter the second mode of operation is received.

In some examples, the volatile memory may include random access memory. In some examples, the non-volatile memory may include NAND memory.

Figure 4:
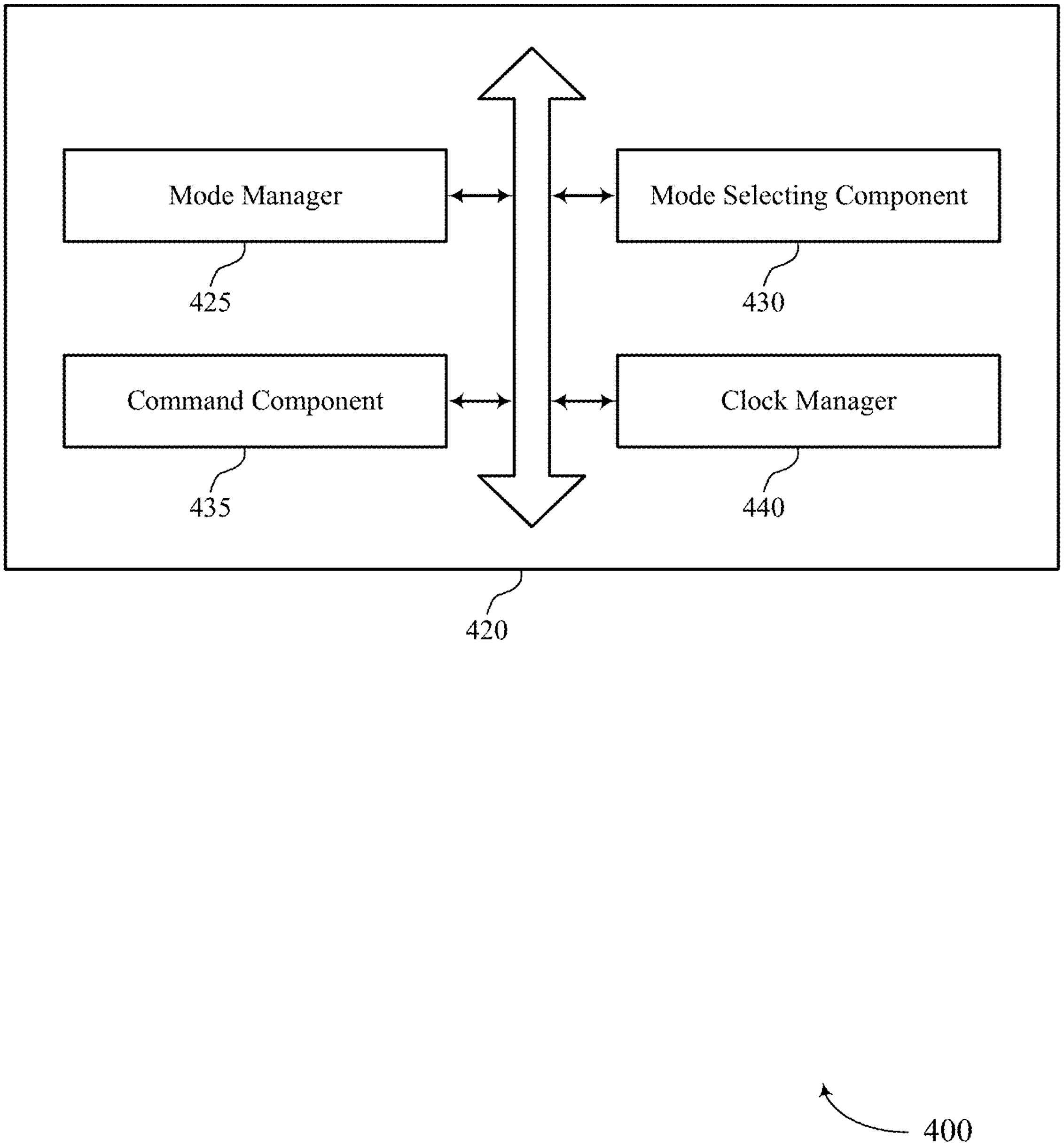
FIG. 4 shows a block diagram of a host system that supports a light hibernation mode for memory in accordance with examples as disclosed herein.

FIG. 4 shows a block diagram 400 of a host system 420 that supports a light hibernation mode for memory in accordance with examples as disclosed herein. The host system 420 may be an example of aspects of a host system as described with reference to FIGS. 1 through 2. The host system 420, or various components thereof, may be an example of means for performing various aspects of the light hibernation mode for memory as described herein. For example, the host system 420 may include a mode manager 425, a mode selecting component 430, a command component 435, a clock manager 440, or any combination thereof. Each of these components may communicate, directly or indirectly, with one another (e.g., via one or more buses).

The mode manager 425 may be configured as or otherwise support a means for determining to transition a memory system, for a time period, from a first mode of operation to a second mode of operation corresponding to lower power consumption by the memory system than the first mode of operation. The mode selecting component 430 may be configured as or otherwise support a means for selecting the second mode of operation from a set of low power modes associated with the memory system based at least in part on determining to transition the memory system, based at least in part on whether the time period satisfies a threshold duration, or both. The set of low power modes may include a first low power mode corresponding to lower power consumption by the memory system than the first mode of operation and a second low power mode corresponding to lower power consumption by the memory system than the first low power mode. The command component 435 may be configured as or otherwise support a means for transmitting, to the memory system, a command for the memory system to enter the second mode of operation.

In some examples, the mode selecting component 430 may be configured as or otherwise support a means for selecting, as the second mode of operation, the first low power mode based at least in part on the time period failing to satisfy the threshold duration. If the second low power mode is selected as the second mode of operation, the command for the memory system to enter the second mode of operation may be a command for the memory system to enter the first low power mode.

In some examples, the mode selecting component 430 may be configured as or otherwise support a means for selecting, as the second mode of operation, the second low power mode based at least in part on the time period satisfying the threshold duration. If the second low power mode is selected as the second mode of operation, the command for the memory system to enter the second mode of operation may be a command for the memory system to enter the second low power mode.

In some examples, the command component 435 may be configured as or otherwise support a means for transmitting, after the time period, a second command for the memory system to exit the second mode of operation.

In some examples, the clock manager 440 may be configured as or otherwise support a means for updating, during the time period, a clock rate associated with the memory system, where determining to transition to the memory system to the second mode of operation for the time period may be based at least in part on determining to update the clock rate.

Figure 5:
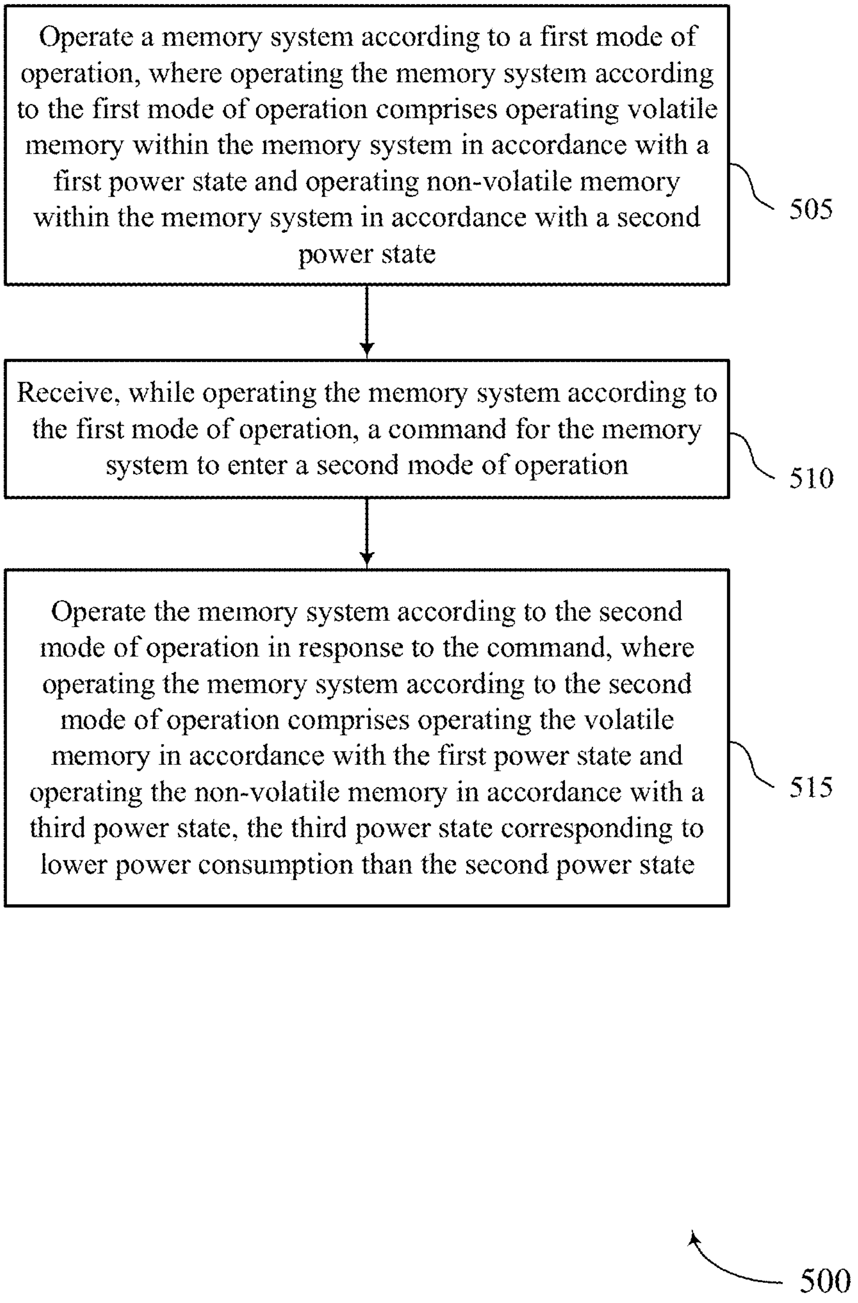
FIGS. 5 and 6 show flowcharts illustrating a method or methods that support a light hibernation mode for memory in accordance with examples as disclosed herein.

FIG. 5 shows a flowchart illustrating a method 500 that supports a light hibernation mode for memory in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 505, the method may include operating a memory system according to a first mode of operation, where operating the memory system according to the first mode of operation includes operating volatile memory within the memory system in accordance with a first power state and operating non-volatile memory within the memory system in accordance with a second power state. The operations of 505 may be performed in accordance with examples as disclosed herein. In some examples, aspects of the operations of 505 may be performed by a mode manager 325 as described with reference to FIG. 3.

At 510, the method may include receiving, while operating the memory system according to the first mode of operation, a command for the memory system to enter a second mode of operation. The operations of 510 may be performed in accordance with examples as disclosed herein. In some examples, aspects of the operations of 510 may be performed by a command component 330 as described with reference to FIG. 3.

At 515, the method may include operating the memory system according to the second mode of operation in response to the command, where operating the memory system according to the second mode of operation includes operating the volatile memory in accordance with the first power state and operating the non-volatile memory in accordance with a third power state, the third power state corresponding to lower power consumption than the second power state. The operations of 515 may be performed in accordance with examples as disclosed herein. In some examples, aspects of the operations of 515 may be performed by a mode manager 325 as described with reference to FIG. 3.

In some examples, an apparatus as described herein may perform a method or methods, such as the method 500. The apparatus may include, features, circuitry, logic, means, or instructions (e.g., a non-transitory computer-readable medium storing instructions executable by a processor) for operating a memory system according to a first mode of operation, where operating the memory system according to the first mode of operation includes operating volatile memory within the memory system in accordance with a first power state and operating non-volatile memory within the memory system in accordance with a second power state, receiving, while operating the memory system according to the first mode of operation, a command for the memory system to enter a second mode of operation, and operating the memory system according to the second mode of operation in response to the command, where operating the memory system according to the second mode of operation includes operating the volatile memory in accordance with the first power state and operating the non-volatile memory in accordance with a third power state, the third power state corresponding to lower power consumption than the second power state.

Some examples of the method 500 and the apparatus described herein may further include operations, features, circuitry, logic, means, or instructions for receiving, while operating the memory system according to the first mode of operation, a second command for the memory system to enter a third mode of operation, where operating the memory system according to the third mode of operation includes operating the volatile memory in accordance with a fourth power state corresponding to lower power consumption than the first power state and operating the non-volatile memory in accordance with the third power state.

Some examples of the method 500 and the apparatus described herein may further include operations, features, circuitry, logic, means, or instructions for transferring a greater quantity of data from the volatile memory to the non-volatile memory in response to the second command for the memory system to enter the third mode of operation than in response to the command for the memory system to enter the second mode of operation.

Some examples of the method 500 and the apparatus described herein may further include operations, features, circuitry, logic, means, or instructions for refraining from transferring any data from the volatile memory to the non-volatile memory in response to the command for the memory system to enter the second mode of operation.

Some examples of the method 500 and the apparatus described herein may further include operations, features, circuitry, logic, means, or instructions for storing a greater quantity of data in the volatile memory while operating the memory system according to the second mode of operation than while operating the memory system according to the third mode of operation.

In some examples of the method 500 and the apparatus described herein, data stored in the volatile memory while operating the memory system according to the second mode of operation may include data associated with a host device for the memory system, executable instructions for a controller within the memory system, or any combination thereof.

Some examples of the method 500 and the apparatus described herein may further include operations, features, circuitry, logic, means, or instructions for receiving, while operating the memory system according to the second mode of operation, a third command for the memory system to exit the second mode of operation, receiving, while operating the memory system according to the third mode of operation, a fourth command for the memory system to exit the third mode of operation, and transferring a greater quantity of data from the non-volatile memory to the volatile memory in response to the fourth command for the memory system to exit the third mode of operation than in response to the third command for the memory system to exit the second mode of operation.

Some examples of the method 500 and the apparatus described herein may further include operations, features, circuitry, logic, means, or instructions for operating the memory system according to the first mode of operation after operating the memory system according to the second mode of operation and refraining from transferring any data between the volatile memory and the non-volatile memory between a first time and a second time, the first time before beginning to operate the memory system according to the second mode of operation, and the second time after operating the memory system according to the second mode of operation.

In some examples of the method 500 and the apparatus described herein, a clock signal associated with the memory system may have a first frequency before the command for the memory system to enter the second mode of operation is received and the clock signal may have a second frequency after the command for the memory system to enter the second mode of operation is received.

In some examples of the method 500 and the apparatus described herein, the volatile memory may be random access memory and the non-volatile memory may be NAND memory.

Figure 6:
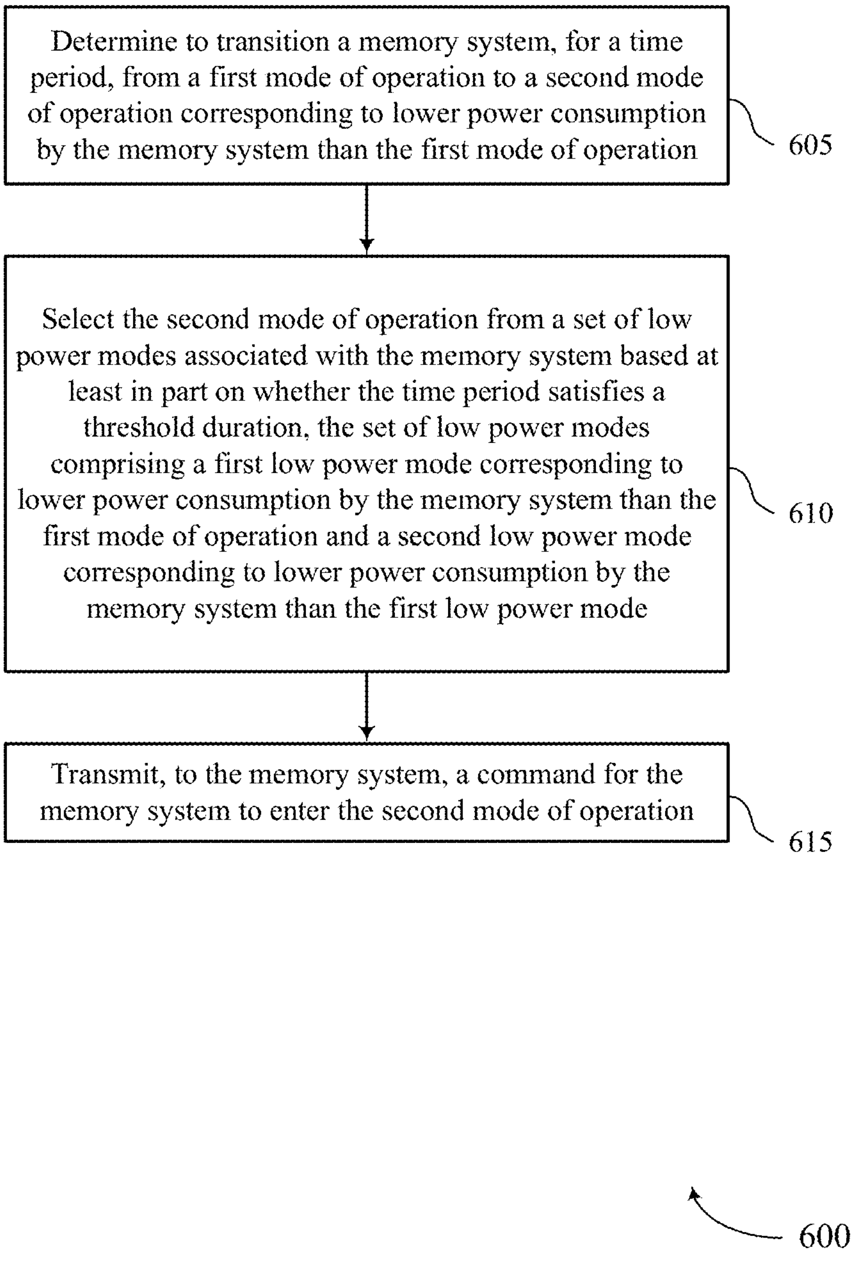

FIG. 6 shows a flowchart illustrating a method 600 that supports a light hibernation mode for memory in accordance with examples as disclosed herein. The operations of method 600 may be implemented by a host system or its components as described herein. For example, the operations of method 600 may be performed by a host system as described with reference to FIGS. 1 through 2 and 4. In some examples, a host system may execute a set of instructions to control the functional elements of the device to perform the described functions. Additionally or alternatively, the host system may perform aspects of the described functions using special-purpose hardware.

At 605, the method may include determining to transition a memory system, for a time period, from a first mode of operation to a second mode of operation corresponding to lower power consumption by the memory system than the first mode of operation. The operations of 605 may be performed in accordance with examples as disclosed herein. In some examples, aspects of the operations of 605 may be performed by a mode manager 425 as described with reference to FIG. 4.

At 610, the method may include selecting the second mode of operation from a set of low power modes associated with the memory system based at least in part on whether the time period satisfies a threshold duration, the set of low power modes including a first low power mode corresponding to lower power consumption by the memory system than the first mode of operation and a second low power mode corresponding to lower power consumption by the memory system than the first low power mode. The operations of 610 may be performed in accordance with examples as disclosed herein. In some examples, aspects of the operations of 610 may be performed by a mode selecting component 430 as described with reference to FIG. 4.

At 615, the method may include transmitting, to the memory system, a command for the memory system to enter the second mode of operation. The operations of 615 may be performed in accordance with examples as disclosed herein. In some examples, aspects of the operations of 615 may be performed by a command component 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for determining to transition a memory system, for a time period, from a first mode of operation to a second mode of operation corresponding to lower power consumption by the memory system than the first mode of operation, selecting the second mode of operation from a set of low power modes associated with the memory system based at least in part on whether the time period satisfies a threshold duration, the set of low power modes including a first low power mode corresponding to lower power consumption by the memory system than the first mode of operation and a second low power mode corresponding to lower power consumption by the memory system than the first low power mode, and transmitting, to the memory system, a command for the memory system to enter the second mode of operation.

Some examples of the method 600 and the apparatus described herein may further include operations, features, circuitry, logic, means, or instructions for selecting, as the second mode of operation, the first low power mode based at least in part on the time period failing to satisfy the threshold duration, where the command for the memory system to enter the second mode of operation may be a command for the memory system to enter the first low power mode.

Some examples of the method 600 and the apparatus described herein may further include operations, features, circuitry, logic, means, or instructions for selecting, as the second mode of operation, the second low power mode based at least in part on the time period satisfying the threshold duration, where the command for the memory system to enter the second mode of operation may be a command for the memory system to enter the second low power mode.

Some examples of the method 600 and the apparatus described herein may further include operations, features, circuitry, logic, means, or instructions for transmitting, after the time period, a second command for the memory system to exit the second mode of operation.

Some examples of the method 600 and the apparatus described herein may further include operations, features, circuitry, logic, means, or instructions for updating, during the time period, a clock rate associated with the memory system, where determining to transition to the memory system to the second mode of operation for the time period may be based at least in part on determining to update the clock rate.

It should be noted that the methods described above describe possible implementations, and that the operations and the steps may be rearranged or otherwise modified and that other implementations are possible. Further, portions from two or more of the methods may be combined.

An apparatus is described. The apparatus may include volatile memory, non-volatile memory, and a controller coupled with the volatile memory and the non-volatile memory. The controller may be configured to cause the apparatus to operate the apparatus according to a first mode of operation, where operating the apparatus according to the first mode of operation comprises operating the volatile memory in accordance with a first power state and operating the non-volatile memory in accordance with a second power state, receive, while operating the apparatus according to the first mode of operation, a command for the apparatus to enter a second mode of operation, and operate the apparatus according to the second mode of operation in response to the command, where operating the apparatus according to the second mode of operation comprises operating the volatile memory in accordance with the first power state and operating the non-volatile memory in accordance with a third power state, the third power state corresponding to lower power consumption than the second power state.

In some examples of the apparatus, the controller may be further configured to cause the apparatus to receive, while operating the apparatus according to the first mode of operation, a second command for the apparatus to enter a third mode of operation, where operating the apparatus according to the third mode of operation comprises operating the volatile memory in accordance with a fourth power state corresponding to lower power consumption than the first power state and operating the non-volatile memory in accordance with the third power state.

In some examples of the apparatus, the controller may be further configured to cause the apparatus to transfer a greater quantity of data from the volatile memory to the non-volatile memory in response to the second command for the apparatus to enter the third mode of operation than in response to the command for the apparatus to enter the second mode of operation.

In some examples of the apparatus, the controller may be further configured to cause the apparatus to refrain from transferring any data from the volatile memory to the non-volatile memory in response to the command for the apparatus to enter the second mode of operation.

In some examples of the apparatus, the controller may be further configured to cause the apparatus to store a greater quantity of data in the volatile memory while operating the apparatus according to the second mode of operation than while operating the apparatus according to the third mode of operation.

In some examples of the apparatus, the data that the controller is configured to cause the apparatus to store in the volatile memory while operating the apparatus according to the second mode of operation comprises data associated with a host device for the apparatus, executable instructions for the controller, or any combination thereof.

In some examples of the apparatus, the controller may be further configured to cause the apparatus to receive, while operating the apparatus according to the second mode of operation, a third command for the apparatus to exit the second mode of operation, receive, while operating the apparatus according to the third mode of operation, a fourth command for the apparatus to exit the third mode of operation, and transfer a greater quantity of data from the non-volatile memory to the volatile memory in response to the fourth command for the apparatus to exit the third mode of operation than in response to the third command for the apparatus to exit the second mode of operation.

In some examples of the apparatus, the controller may be further configured to cause the apparatus to operate the apparatus according to the first mode of operation after operating the apparatus according to the second mode of operation and refrain from transferring any data between the volatile memory and the non-volatile memory between a first time and a second time, the first time before beginning to operate the apparatus according to the second mode of operation, and the second time after operating the apparatus according to the second mode of operation.

In some examples of the apparatus, the volatile memory may be random access memory (e.g., SRAM or DRAM), and the non-volatile memory may be NAND memory.

In some examples, the apparatus may be a memory system.

Another apparatus is described. The apparatus may include a controller configured to couple with a memory system, where the controller is configured to cause the apparatus to determine to transition the memory system, for a time period, from a first mode of operation to a second mode of operation corresponding to lower power consumption by the memory system than the first mode of operation, select the second mode of operation from a set of low power modes associated with the memory system based at least in part on whether the time period satisfies a threshold duration, the set of low power modes comprising a first low power mode corresponding to lower power consumption by the memory system than the first mode of operation and a second low power mode corresponding to lower power consumption by the memory system than the first low power mode, and transmit, to the memory system, a command for the memory system to enter the second mode of operation.

In some examples of the apparatus, the controller may be further configured to cause the apparatus to select the first low power mode as the second mode of operation responsive to the time period failing to satisfy the threshold duration.

In some examples of the apparatus, the controller may be further configured to cause the apparatus to select the second low power mode as the second mode of operation responsive to the time period satisfying the threshold duration.

In some examples of the apparatus, the controller may be further configured to cause the apparatus to transmit, after the time period, a second command for the memory system to exit the second mode of operation.

In some examples of the apparatus, the controller may be further configured to cause the apparatus to determine to transition to the memory system to the second mode of operation for the time period based at least in part on determining to update a clock rate associated with the memory system and update the clock rate during the time period.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a first type of memory;

a second type of memory different than the first type of memory; and processing circuitry coupled with the first type of memory and the second type of memory, the processing circuitry configured to cause the apparatus to:

operate according to a first mode of operation, wherein operating the apparatus according to the first mode of operation comprises operating the first type of memory in accordance with a first power state and operating the second type of memory in accordance with a second power state; and operate according to a second mode of operation in response to an indication to change a mode of operation, wherein operating the apparatus according to the second mode of operation comprises operating the first type of memory in accordance with the first power state and operating the second type of memory in accordance with a third power state corresponding to a different power consumption than the second power state.

2. The apparatus of claim 1, wherein:

to operate the apparatus according to the first mode of operation, the processing circuitry is configured to cause the apparatus to operate the second type of memory in accordance with a first clock frequency; and to operate the apparatus according to the second mode of operation, the processing circuitry is configured to cause the apparatus to operate the second type of memory in accordance with a second clock frequency different than the first clock frequency.

3. The apparatus of claim 1, wherein the processing circuitry is further configured to cause the apparatus to:

operate the apparatus according to a third mode of operation in response to a second indication to change a mode of operation, wherein operating the apparatus according to the third mode of operation comprises operating the first type of memory in accordance with a fourth power state corresponding to a different power consumption than the first power state and operating the second type of memory in accordance with a fifth power state corresponding to a different power consumption than the second power state.

4. The apparatus of claim 3, wherein the second indication to change a mode of operation is based at least in part on a duration of operation according to the third mode of operation.

5. The apparatus of claim 3, wherein:

a transition from the first mode of operation to the second mode of operation is associated with a first power consumption; and a transition from the first mode of operation to the third mode of operation is associated with a second power consumption that is greater than the first power consumption.

6. The apparatus of claim 3, wherein:

to operate the apparatus according to the second mode of operation, the processing circuitry is configured to cause the apparatus to operate a first portion of the first type of memory; and to operate the apparatus according to the third mode of operation, the processing circuitry is configured to cause the apparatus to operate a second portion of the first type of memory that is smaller than the first portion.

7. The apparatus of claim 3, wherein:

to operate the apparatus in accordance with the second mode of operation, the processing circuitry is configured to cause the apparatus to transfer a first quantity of data between the first type of memory and the second type of memory; and to operate the apparatus in accordance with the third mode of operation, the processing circuitry is configured to cause the apparatus to transfer a second quantity of data between the first type of memory and the second type of memory that is greater than or less than the first quantity of data.

8. The apparatus of claim 1, wherein:

the first type of memory comprises volatile memory; and the second type of memory comprises non-volatile memory.

9. An apparatus, comprising:

volatile memory;

non-volatile memory; and processing circuitry coupled with the volatile memory and the non-volatile memory, the processing circuitry configured to cause the apparatus to:

operate according to a first mode of operation in response to a first indication to change a mode of operation, wherein operating the apparatus according to the first mode of operation comprises transferring a first quantity of data between the volatile memory and the non-volatile memory; and operate according to a second mode of operation in response to a second indication to change a mode of operation, wherein operating the apparatus according to the second mode of operation comprises transferring a second quantity of data between the volatile memory and the non-volatile memory that is greater than the first quantity of data.

10. The apparatus of claim 9, wherein the second indication to change a mode of operation is based at least in part on a duration of operation according to the second mode of operation.

11. The apparatus of claim 9, wherein:

a transition to the first mode of operation is associated with a first power consumption; and a transition to the second mode of operation is associated with a second power consumption that is greater than the first power consumption.

12. The apparatus of claim 9, wherein:

to operate the apparatus according to the first mode of operation, the processing circuitry is configured to cause the apparatus to operate a first portion of the volatile memory; and to operate the apparatus according to the second mode of operation, the processing circuitry is configured to cause the apparatus to operate a second portion of the volatile memory that is smaller than the first portion of the volatile memory.

13. The apparatus of claim 9, wherein the processing circuitry is further configured to cause the apparatus to:

operate the apparatus according to a third mode of operation, wherein operating the apparatus according to the third mode of operation comprises performing memory operations in accordance with a first clock frequency, wherein operating the apparatus according to the first mode of operation, the second mode of operation, or both comprises performing memory operations in accordance with a second clock frequency that is lower than the first clock frequency.

14. An apparatus, comprising:

a controller operable for configuring access of a first type of memory and a second type of memory different than the first type of memory, the controller configured to cause the apparatus to:

operate according to a first mode of operation in response to a first indication to change a mode of operation, the first mode of operation associated powering down a first portion of the first type of memory; and operate according to a second mode of operation in response to a second indication to change a mode of operation, the second mode of operation associated powering down a second portion of the first type of memory that is larger than the first portion.

15. The apparatus of claim 14, wherein the second indication to change a mode of operation is based at least in part on a duration of operation according to the second mode of operation.

16. The apparatus of claim 14, wherein:

a transition to the first mode of operation is associated with a first power consumption; and a transition to the second mode of operation is associated with a second power consumption that is greater than the first power consumption.

17. The apparatus of claim 14, wherein the controller is further configured to cause the apparatus to:

operate the apparatus according to a third mode of operation that is not associated with powering down the first type of memory.

18. The apparatus of claim 17, wherein:

to operate the apparatus according to the third mode of operation, the controller is configured to cause the apparatus to perform memory operations in accordance with a first clock frequency; and to operate the apparatus according to the first mode of operation, the second mode of operation, or both the controller is configured to cause the apparatus to perform memory operations in accordance with a second clock frequency that is lower than the first clock frequency.

19. The apparatus of claim 17, wherein:

to operate the apparatus according to the third mode of operation, the controller is configured to cause the apparatus to operate the second type of memory in accordance with a first power state; and to operate the apparatus according to the first mode of operation, the second mode of operation, or both the controller is configured to cause the apparatus to operate the second type of memory in accordance with a second power state corresponding to a lower power consumption than the first power state.

20. The apparatus of claim 14, wherein:

the first type of memory comprises volatile memory; and the second type of memory comprises non-volatile memory.

* * * * *